United States Patent
Porras et al.

(10) Patent No.: US 10,543,734 B2
(45) Date of Patent: Jan. 28, 2020

(54) ELECTRIFIED VEHICLE CABIN HEATING

(71) Applicant: FORD GLOBAL TECHNOLOGIES, LLC, Dearborn, MI (US)

(72) Inventors: Angel Fernando Porras, Dearborn, MI (US); Timothy Noah Blatchley, Dearborn, MI (US); Mark Anthony Rockwell, Wyandotte, MI (US); Justin Reuel Badger, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 604 days.

(21) Appl. No.: 14/887,452

(22) Filed: Oct. 20, 2015

(65) Prior Publication Data

US 2017/0106724 A1    Apr. 20, 2017

(51) Int. Cl.
| | | |
|---|---|---|
| *B60H 1/14* | (2006.01) | |
| *H01M 10/663* | (2014.01) | |
| *B60L 58/26* | (2019.01) | |
| *B60L 53/10* | (2019.01) | |
| *H01M 10/613* | (2014.01) | |
| *H01M 10/625* | (2014.01) | |
| *H01M 10/6568* | (2014.01) | |
| *H01M 10/66* | (2014.01) | |
| *B60H 1/00* | (2006.01) | |
| *H01M 10/44* | (2006.01) | |

(52) U.S. Cl.
CPC ......... *B60H 1/143* (2013.01); *B60H 1/00385* (2013.01); *B60L 53/11* (2019.02); *B60L 58/26* (2019.02); *H01M 10/44* (2013.01); *H01M 10/613* (2015.04); *H01M 10/625* (2015.04); *H01M 10/6568* (2015.04); *H01M 10/66* (2015.04); *H01M 10/663* (2015.04); *H01M 2220/20* (2013.01)

(58) Field of Classification Search
CPC . B60H 1/143; B60H 1/00385; H01M 10/663; H01M 10/66; H01M 10/613; H01M 10/625; H01M 10/6568; H01M 10/44; H01M 2220/20; B60L 11/185; B60L 11/1874
See application file for complete search history.

(56) References Cited

U.S. PATENT DOCUMENTS

| | | |
|---|---|---|
| 6,481,230 B2 | 11/2002 | Kimishima et al. |
| 8,336,319 B2 | 12/2012 | Johnston et al. |
| 8,525,480 B2 | 9/2013 | Anderson |
| 8,679,659 B2 | 3/2014 | Claypole et al. |
| 2002/0043413 A1 | 4/2002 | Kimishima et al. |
| 2012/0225341 A1* | 9/2012 | Major ............... B60H 1/00278 429/120 |
| 2016/0229282 A1* | 8/2016 | Hettrich ................ B60K 11/02 |

FOREIGN PATENT DOCUMENTS

| | | |
|---|---|---|
| FR | 3004387 | 10/2014 |
| JP | 2011255735 | * 12/2011 |
| JP | 2014061798 | 4/2014 |
| WO | 2014069278 | 5/2014 |

OTHER PUBLICATIONS

Ottaway, Luke, Good News for EV Owners From DC Fast Charging Results, Torque News, Mar. 21, 2014, retrieved from http://www.torquenews.com/2250/resultsdcfastchargingstudyaregoodnewsevowners on Sep. 4, 2015.

* cited by examiner

*Primary Examiner* — Ladan Mohaddes
(74) *Attorney, Agent, or Firm* — David Kelley; Carlson, Gaskey & Olds, P.C.

(57) ABSTRACT

An exemplary electrified vehicle assembly includes a battery pack, a cabin heater, and a coolant loop that communicates liquid coolant from the battery pack to the cabin heater. The cabin heater configured to heat a cabin of a vehicle with thermal energy from liquid coolant.

19 Claims, 4 Drawing Sheets

ELECTRIFIED VEHICLE CABIN HEATING

TECHNICAL FIELD

This disclosure relates generally to heating a cabin of an electrified vehicle. More particularly, the disclosure relates to using thermal energy from charging a battery to heat the cabin.

BACKGROUND

Generally, electrified vehicles differ from conventional motor vehicles because electrified vehicles are selectively driven using one or more electric machines powered by batteries. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Charging the batteries of electrified vehicles can generate thermal energy, especially during a fast charge. Some electrified vehicles use coolant to transfer thermal energy away from charging batteries. Liquid coolant can be used to manage thermal energy levels in the batteries that supply power to the electric machines. Liquid coolant can increase or decrease the battery temperature as needed to, for example, prepare the battery for charging or to enhance performance.

SUMMARY

An electrified vehicle assembly according to an exemplary aspect of the present disclosure includes, among other things, a battery pack, a cabin heater, and a coolant loop that communicates liquid coolant from the battery pack to the cabin heater. The cabin heater configured to heat a cabin of a vehicle with thermal energy from liquid coolant.

In a further non-limiting embodiment of the foregoing assembly, the liquid coolant cools the battery pack during a charge.

In a further non-limiting embodiment of any of the foregoing assemblies, the cabin heater comprises a heater core configured to transfer thermal energy from the liquid coolant in the coolant loop to a flow of air that heats a cabin of a vehicle.

In a further non-limiting embodiment of any of the foregoing assemblies, the assembly includes a blower that moves the flow of air through the cabin heater.

In a further non-limiting embodiment of any of the foregoing assemblies, the assembly includes a chiller, and the coolant loop is to further communicate the liquid coolant from the cabin heater to the chiller.

In a further non-limiting embodiment of any of the foregoing assemblies, the assembly includes a refrigerant loop. The chiller is configured to transfer thermal energy from the liquid coolant in the coolant loop to an expandable refrigerant in the refrigerant loop.

In a further non-limiting embodiment of any of the foregoing assemblies, the assembly includes a valve assembly configured to direct the liquid coolant from the battery pack to the cabin heater under some operating conditions, and configured to direct the liquid coolant from the battery pack to a radiator under other operating conditions.

In a further non-limiting embodiment of any of the foregoing assemblies, the assembly includes a valve assembly configured to direct the liquid coolant from the battery pack to the cabin heater under some operating conditions, and configured to direct the liquid coolant from the battery pack to a chiller under other operating conditions.

In a further non-limiting embodiment of any of the foregoing assemblies, the charge is a fast charge.

In a further non-limiting embodiment of any of the foregoing assemblies, the charge is a DC fast charge.

In a further non-limiting embodiment of any of the foregoing assemblies, the battery pack is a traction battery pack.

A method of cooling a battery pack during charging according to an exemplary aspect of the present disclosure includes, among other things, communicating a liquid coolant through a battery pack to remove thermal energy from the battery pack that is generated when charging the battery pack, and communicating the liquid coolant from the battery pack to a cabin heater.

In a further non-limiting embodiment of the foregoing method, the method includes transferring thermal energy from the liquid coolant to a flow of air at a heater core of the cabin heater, and heating a cabin of a vehicle using the flow of air.

In a further non-limiting embodiment of any of the foregoing methods, the method includes maintaining the liquid coolant in a liquid phase during the transferring and heating.

In a further non-limiting embodiment of any of the foregoing methods, the charging is a fast charge.

In a further non-limiting embodiment of any of the foregoing methods, the charging is a DC fast charge.

In a further non-limiting embodiment of any of the foregoing methods, the method includes communicating the liquid coolant away from the battery pack using a coolant loop that extends from the battery pack to the cabin heater.

In a further non-limiting embodiment of any of the foregoing methods, the method includes communicating the liquid coolant along the coolant loop from the cabin heater to a chiller and transferring thermal energy from the liquid coolant to an expandable refrigerant at the chiller.

In a further non-limiting embodiment of any of the foregoing methods, the method includes, after the charging, actuating at least one valve to cause the coolant loop to extend from the battery pack to a radiator, and communicating the liquid coolant through the radiator to remove thermal energy from the liquid coolant.

In a further non-limiting embodiment of any of the foregoing methods, the method includes, after the charging, actuating at least one valve to cause the coolant loop to extend from the battery pack to a chiller, and communicating the liquid coolant through the chiller to remove thermal energy from the liquid coolant.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to heating a cabin, or passenger compartment, of an electrified vehicle. More specifically, the disclosure is directed toward using thermal energy generated when charging a battery to heat the cabin, especially thermal energy generated when fast charging of the battery.

Figure 1:
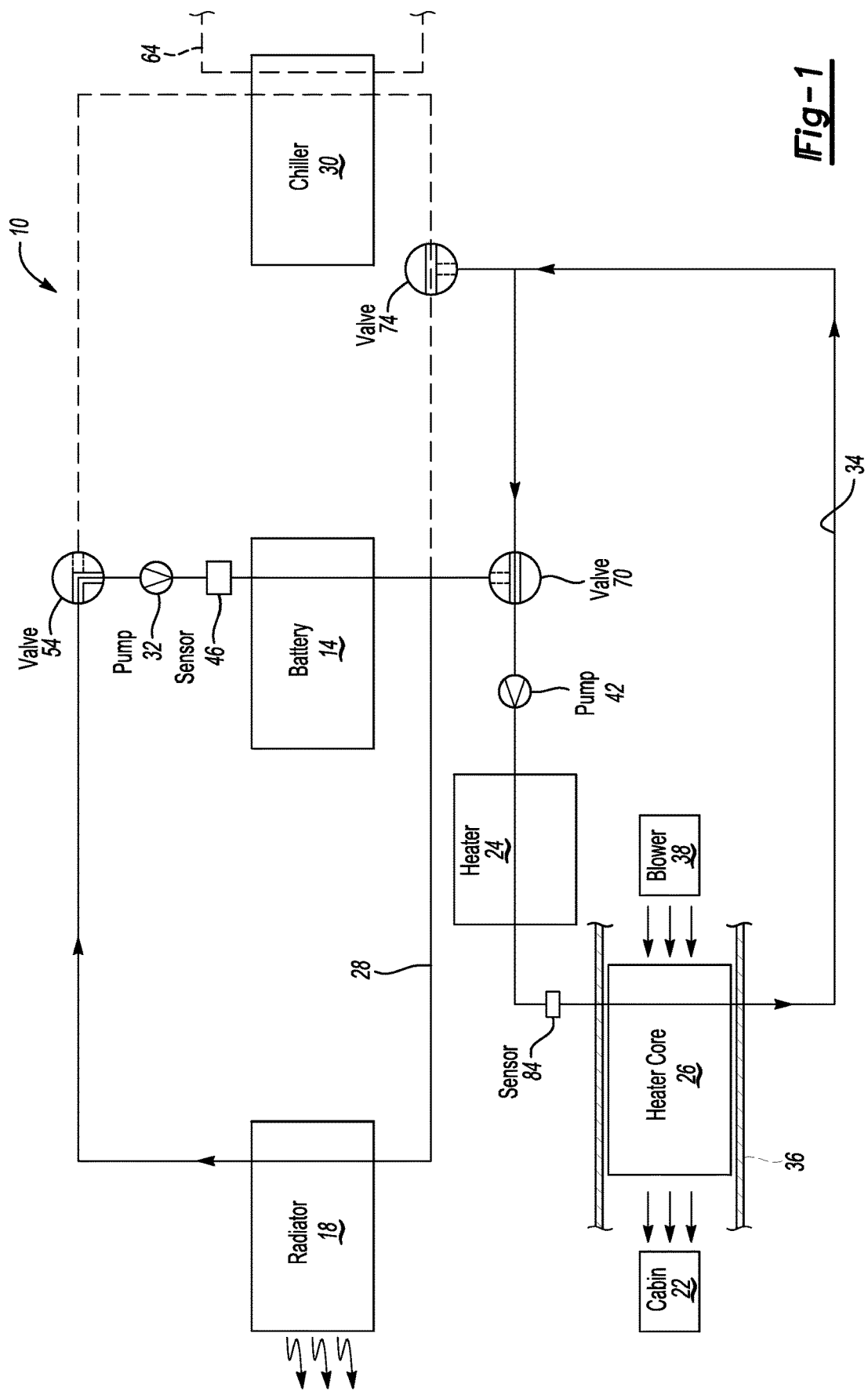
FIG. 1 shows an example battery and cabin control system operating under a first operating condition.

Referring to FIG. 1, an example battery and cabin control system 10 includes a battery 14, a radiator 18, a cabin 22, a coolant heater 24, and a heater core 26. The system 10 is utilized in an electrified vehicle.

The battery 14, in this example, is a traction battery. The battery 14 includes a plurality of battery cells that can selectively power one or more electric machines to drive one or more sets of drive wheels of the vehicle.

In some examples, the vehicle incorporating the system 10 is a hybrid vehicle having a first drive system that includes the electric machines and the battery 14, and a second drive system that includes an internal combustion engine and a generator. The two drive systems can selectively generate torque to drive the vehicle wheels.

In another example, the battery 14 provides power to one or more electric machines that drive wheels of a battery electric vehicle. In the battery electric vehicle, the drive wheels are drive exclusively by the one more electric machines.

Battery cells within the battery 14 can heat up during charging, during vehicle operation, and in high ambient temperature environments. Maintaining a temperature of the battery cells within a threshold temperature range can enhance the efficiencies of the battery 14 and lengthen the useful life of the battery 14. In some examples, the threshold temperature range is from 0 to 35 degrees Celsius. Cooling the battery 14 is often required to maintain or bring the temperature of the battery 14 within the threshold temperature range.

The cabin 22 generally refers to a passenger compartment of the vehicle. The cabin 22 is a substantially enclosed area provide for an occupant of the vehicle to sit. Heating or cooling the cabin 22 can be necessary to provide a comfortable environment for the occupant.

In FIG. 1, the system 10 is shown schematically operating under a first operating condition where the battery 14 is cooled using the radiator 18, and the cabin 22 is heated using the coolant heater 24 and the heater core 26. The vehicle could operate the system under the first operating condition when the battery 14 is generating heat and the cabin 22 also requires heating.

When operating under the first operating condition, a first coolant loop 28 of the system 10 extends from the battery 14 to the radiator 18. A pump 32 can be used to move coolant along the first coolant loop 28. The first coolant loop 28 communicates a flow of a fluid, such as a liquid coolant, from the battery 14 to the radiator 18. The flow moving from the battery 14 to the radiator 18 along the first coolant loop 28 carries thermal energy from the battery 14 to the radiator 18. At the radiator 18, thermal energy is transferred from the flow within the first coolant loop 28 to ambient outside the vehicle. A cooling fan can be used to force air through the radiator 18 or if the vehicle is moving ram air is used to minimize fan operation. The radiator 18 is a battery radiator in this example.

Moving flow along the first coolant loop 28 from the battery 14 to the radiator 18 carries thermal energy away from the battery 14 to cool the battery 14. Within the battery 14, the flow can pass through a heat exchange plate where the fluid takes on thermal energy from battery cells disposed upon the heat exchange plate. In other examples, the fluid passes through axially adjacent battery cells to take on thermal energy instead of, or in addition to, passing through the heat exchange plate.

When operating under the first operating condition, the system 10 includes a second coolant loop 34 extending from the coolant heater 24 to the heater core 26. The heater core 26 and the coolant heater 24 together provide a cabin heater assembly that can provide thermal energy to heat the cabin 22.

A pump 42 can be used to move coolant along the second coolant loop 34. In the first operating condition, the first coolant loop 28 and the second coolant loop 34 are separate and distinct from one another.

At the coolant heater 24, a fluid within the second coolant loop 34, such as a liquid coolant, is heated. The coolant heater 24 is a positive temperature coefficient heater in this example. The coolant heater 24 is electrically powered and transfers thermal energy to fluid within the second coolant loop 34. The fluid then moves to the heater core 26.

The heater core 26 can be disposed within an HVAC case and, more specifically, within a duct 36 of the HVAC case. A blower 38 directs air through the duct 36 and through at least a portion of the heater core 26. Thermal energy from fluid within the second coolant loop 34 transfers to the air moved through the heater core 26 by the blower 38. A portion of the second coolant loop 34 thus extends into the duct 36 and no separate fluid circuit is required to convey thermal energy from the fluid within the second coolant loop 34 to the air moved through the heater core 26 by the blower 38. The air moves from the duct 36 to the cabin 22 to heat the cabin 22. Heating the cabin 22 can raise the temperature of the cabin 22 to a comfortable level for the occupant.

In the example of first operating condition of FIG. 1, the battery 14 is cooled using the first coolant loop 28, and the cabin 22 is heated using the second coolant loop. In other examples of a first operating condition, the battery 14 is cooled using the first coolant loop 28 and the cabin 22 is cooled using a conventional A/C system. In still other examples of the first operating condition, the battery 14 is cooled using the first coolant loop 28 and the cabin 22 is neither heated nor cooled when the system 10.

Referring again to the first coolant loop 28 of FIG. 1, a sensor 46 is used to monitor a temperature of fluid entering the battery 14. If a temperature of the fluid is not low enough to remove sufficient thermal energy from the battery 14, the system 10 can switch to operate under a second operating condition to cool the battery 14 in a different way.

For example, if the battery 14 generates surplus thermal energy that cannot be effectively communicated to ambient air at the radiator 18, the system 10 can switch to the second operating condition to provide additional cooling to keep the temperature of the battery 14 below the threshold temperature.

Figure 2:
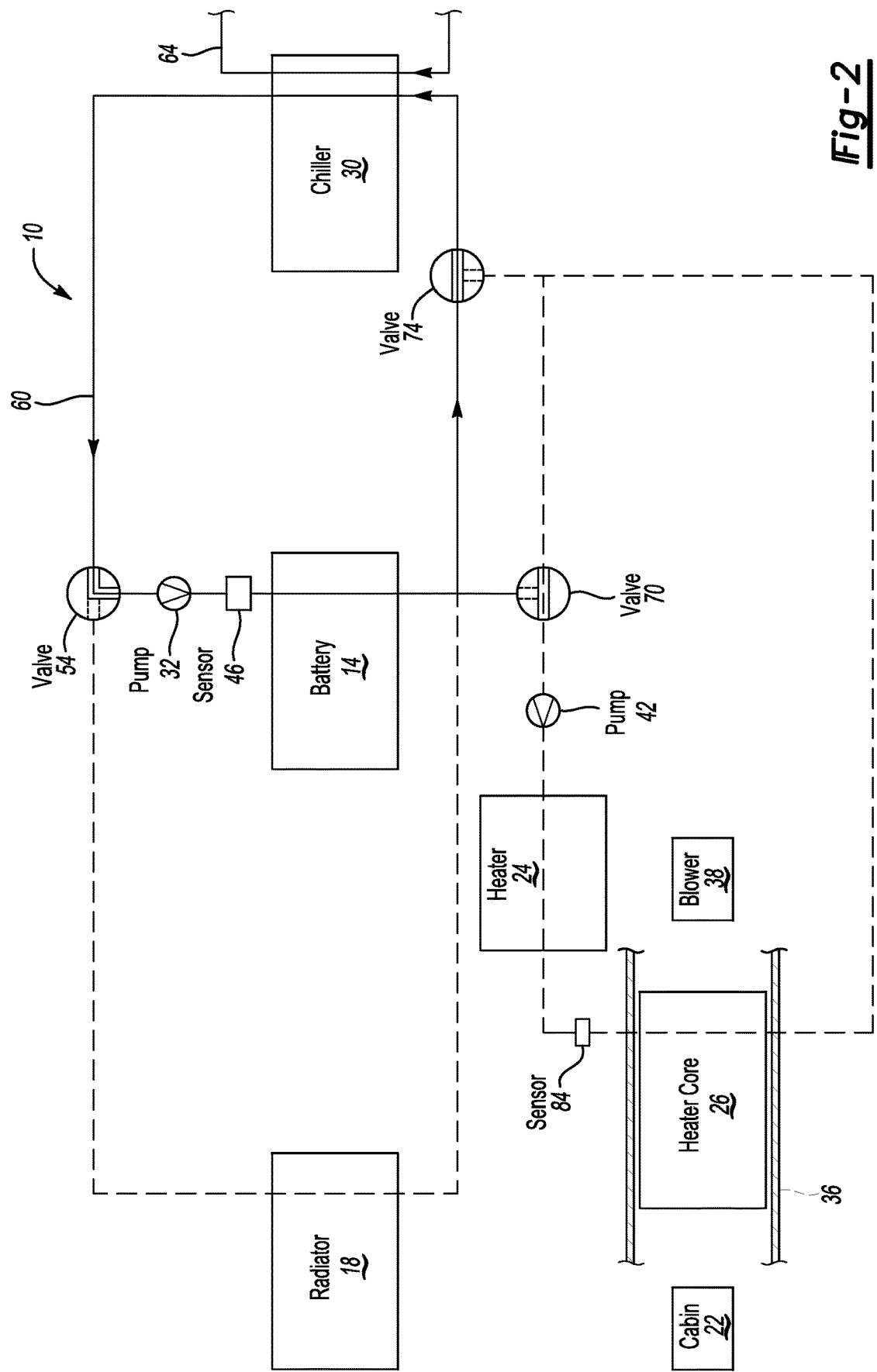
FIG. 2 shows the battery and cabin control system of FIG. 1 operating under a second operating condition.

Referring to FIG. 2, the system 10 is shown operating under the second operating condition where the battery 14 is cooled using the chiller 30, and the cabin 22 is heated using the coolant heater 24 and the heater core 26. The vehicle could operate the system under the second operating condition when the battery 14 is generating more heat that the radiator 18 can effectively transition to ambient, such as when the battery 14 requires cooling when the ambient temperature is relatively high. In such ambient temperatures, cooling, rather than heating, the cabin 22 can often be required. Thus, the pump 42 is not moving fluid through the second coolant loop 34 in FIG. 2. A cabin conditioning system having a refrigerant can be used to cool the cabin 22.

When operating under the second operating condition, a third coolant loop 60 of the system 10 extends from the battery 14 to the chiller 30. The pump 32 can be used to move fluid along the third coolant loop. A first valve 54 is actuated, in this example, to cause fluid to move along the third coolant loop 60 rather than the first coolant loop 28 of FIG. 1.

Fluid moving along the third coolant loop 60 carries thermal energy from the battery 14 to the chiller 30. The refrigerant of the cabin condition system passing through the chiller 30 on a refrigerant flow path 64. The refrigerant takes on thermal energy from the coolant in the third coolant loop 60. The chiller 30 can, in this example, provide more cooling to the battery 14 than the radiator 18.

The refrigerant passing through chiller 30 on the refrigerant flow path is part of a cabin air conditioning system that can be used to cool the cabin 22. A person having skill in this art and the benefit of this disclosure would understand cabin conditioning systems using refrigerant. Such systems typically include at least a compressor to compress the refrigerant, an expansion valves, an evaporator, refrigerant pressure transducer, and a condenser. The refrigerant transitions through vapor and liquid states during a refrigerant cooling cycle of a cabin conditioning system.

In this example, under the second operating condition, a valve transitions to communicate some of the liquid refrigerant to the chiller 30 to cool the fluid moving along the third coolant loop 60 through the chiller 30. Operating the chiller 30 detracts from the efficiencies of the cabin conditioning system as the chiller 30 is an active system. The radiator 18 provides a passive system and is thus generally preferred for cooling the battery 14 unless the radiator 18 is unable to provide sufficient cooling. Accordingly, the system 10 typically cools the battery 14 utilizing the radiator 18 in the first coolant loop 28 unless and until the radiator 18 can no longer remove enough thermal energy from fluid within the first coolant loop 28 to effectively cool the battery 14.

In the example of second operating condition of FIG. 2, the battery 14 is cooled using the third coolant loop 60, and the cabin 22 is cooled using the cabin conditioning system. In other examples of the second operating condition, the battery 14 is cooled using the third coolant loop 60 and the cabin 22 is heated with using the second coolant loop 34. In still other examples of the second operating condition, the battery 14 is cooled using the third coolant loop 60 and the cabin 22 is neither heated nor cooled.

In FIGS. 1 and 2, the first coolant loop 28 and the third coolant loop 60 are shown as coolant loops that operate independently of each other. That is, either the first coolant loop 28 is using to cool the battery 14 with the radiator 18, or the third coolant loop 60 is used to cool the battery 14 utilizing the chiller 30. In some examples, the battery 14 could be cooled utilizing a combination of cooling from the radiator 18 and cooling from the chiller 30. The valve 54 could be modified to be a proportional coolant valve where some coolant flows to the battery 14 from the radiator 18 and some coolant flows to the battery 14 from the chiller 30. Other valves could also be added to permit flow from both the radiator 18 and the chiller 30 to the battery 14, and from the battery 14 to the radiator 18 and the chiller 30.

The battery 14 can generate heat when the battery 14 is discharging to, for example, power electric machines. The battery 14 can also generate heat when the battery 14 is charged. The first operating condition of FIG. 1 or the second operating condition of FIG. 2 can be used to cool the battery 14 when charging or discharging.

Some techniques for charging the battery 14 generate more thermal energy than other techniques. For example, the battery 14 can generate more thermal energy during a DC fast charge than a conventional non-DC charge. Thermal energy generated by the battery is a generally a function of the electrical current flowing to or from the battery 14. For purposes of this disclosure, a charge is considered a fast charge when a maximum current flowing to the battery 14 is equal or greater than 50 Amps. Fast charges can be DC or AC fast charges.

DC fast charges do not require a conversion from AC to DC when charging, so batteries are charged at much higher maximum currents. In one example, a DC fast charge can charge a battery in 20 to 30 minutes with enough power to support a 100 kilometer vehicle range.

Figure 3:
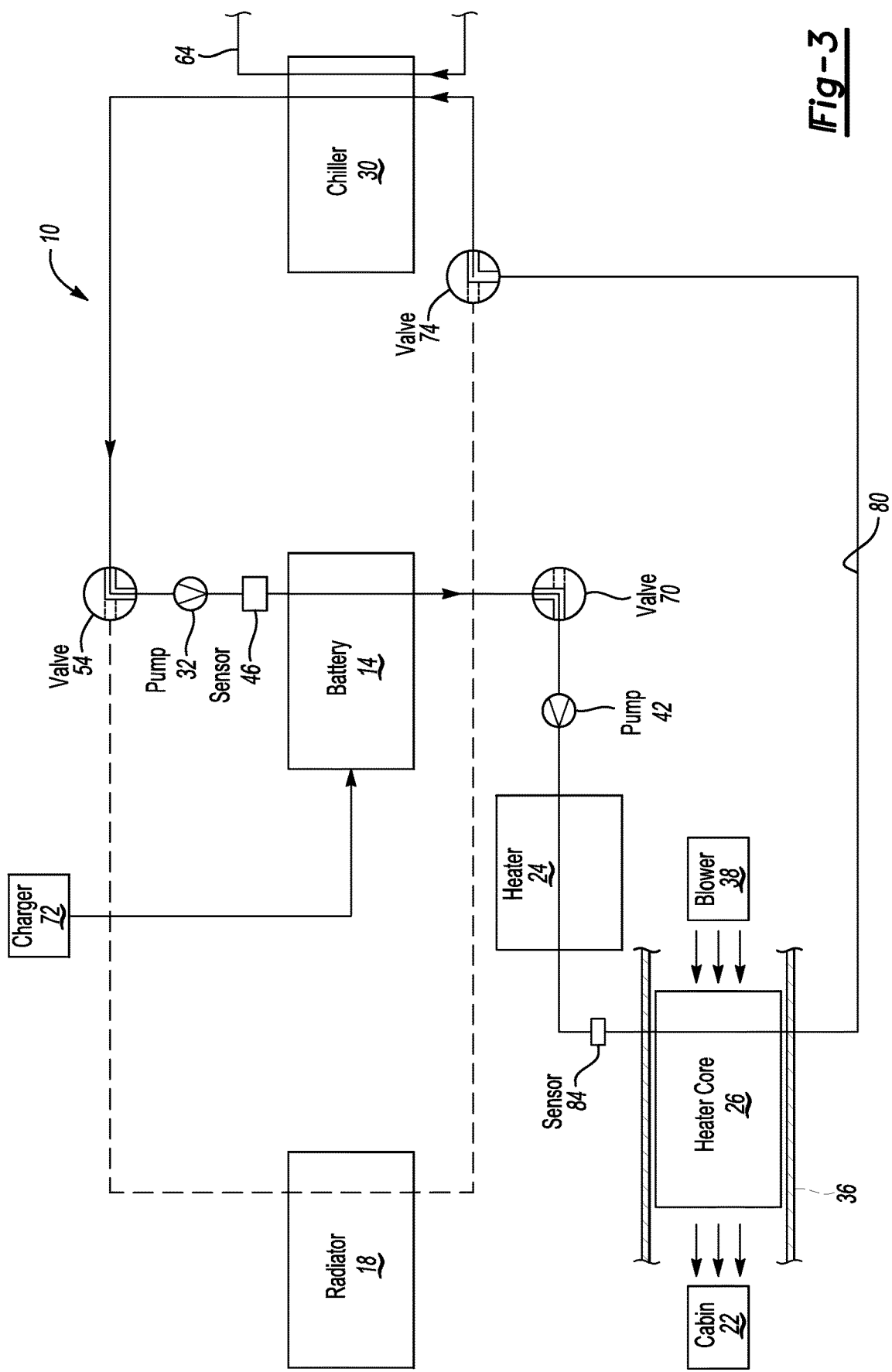
FIG. 3 shows the battery and cabin control system of FIG. 1 operating under a third operating condition.

Referring to FIG. 3, the battery 14 is shown coupled to a charger 72. The charger 72 is, in this example, a DC fast charger, which provides DC current directly to the battery 14 from a wall source without converting from AC to DC. Other AC based charging strategies typically convert AC current to DC current, and then provide the DC current to the battery 14. Fast charging can provide about 150 Amps to the battery 14 whereas other types of charging that convert AC current to DC can provide about 12 to 28 Amps to the battery. Lower provided amperage and converting AC to DC can increase time to charge for the battery 14. Providing DC current to the battery 14 during a fast charge can decrease time required to charge the battery 14, but significantly increases thermal energy generated during charging. Fast charges typically take only about 30 minutes to complete. When not fast charging, a charge can take about 6 hours to complete.

The system 10 in FIG. 3 is shown in an operating condition that utilizes thermal energy generated when charging the battery 14 to heat the cabin 22. There are situations where heating the cabin 22 when charging is desirable. For example, heating the cabin 22 may be desired if an operator is fast charging the battery 14 prior to beginning a drive cycle in a relatively cold ambient conditions. Heat added to the cabin 22 can make the cabin 22 more comfortable if the occupant is seated in the cabin 22 during the charging. Heating the cabin 22 using thermal energy generated by the battery 14 during charging also lessens burdens associated with bringing the cabin 22 to an appropriate temperature for beginning a drive cycle.

That is, say the occupant of the vehicle desires an interior temperature of the cabin 22 to be 68 degrees Fahrenheit during a drive cycle. If an interior temperature of the cabin 22 is 50 degrees Fahrenheit and this temperature can be raised to 60 degrees Fahrenheit using thermal energy from charging the battery 14, less thermal energy would be required from the coolant heater 24 to raise the temperature of the cabin 22 to 68 degrees Fahrenheit during the charging event or during a drive cycle after the charging completes. Thermal energy from fast charging can thus precondition the cabin 22.

To place the system 10 in the third operating condition, the valve 54 is transitioned to a position that directs fluid from the chiller 30 to the pump 32 and battery 14. Another valve 70 is transitioned to a position that directs fluid from the battery 14 to the heater core 26. Yet another valve 74 is transitioned to a position that directs fluid from the coolant heater 24 to the chiller 30.

The valves 54, 70, and 74 are solenoid valves in this example. Other types of valves or mechanisms could be utilized to adjust flow paths within the system 10.

When the valves 54, 70, and 74 are positioned as shown in FIG. 3, a fourth coolant loop 80 extends from the battery 14 through the heater core 26, the coolant heater 24, and the chiller 30. Thermal energy generated when charging the battery 14 is carried by coolant moving along the fourth coolant loop 80 from the battery 14 to the heater core 26.

The blower 38 moves a flow of air through the heater core 26. The flow of air takes on thermal energy from coolant within the fourth coolant loop 80. This thermal energy heats the air, which is then moved to the cabin 22 to heat the cabin. In this example, the coolant heater 24 may or may not be operated when the system 10 operates according to the third operating condition.

A sensor 84 can be used to monitor a temperature of the fluid flowing to the heater core 26. In some examples, the battery 14 generates so much thermal energy during charging that the heater core 26 cannot reduce the thermal energy level of the fluid to a level appropriate for cooling a battery 14 when the coolant returns to the battery 14 from a heater core 26. In such a case, the chiller 30 could be utilized to remove additional thermal energy from the coolant before the coolant returns to the battery 14.

In some examples, the fourth coolant loop does not extend through the chiller 30 and the valve 74 communicates coolant directly to the valve 54. In such examples, further cooling using the chiller 30 is not required.

For example, the battery 14 can, during some DC fast charges, generate six kilowatts of heat, which is carried by the fluid from the battery 14 to the heater core. At the heater core 26 about three to four kilowatts transfers from the fluid to air for heating the cabin 22. The fluid then moves to the chiller 30, which transfers the remaining two to three kilowatts from the fluid to the refrigerant in the refrigerant flow path 64. The temperature of the fluid in the fourth coolant loop is then reduced to a level appropriate for circulating back through the battery 14 to remove additional thermal energy. The sensor 46, the sensor 84, and potentially additional sensors can be used to monitor temperature of the fluid at various locations along the fourth coolant loop. The temperatures can be used to determine whether, and how much, cooling with the chiller 30 is required, or if sufficient thermal energy can be transferred from the fluid within the heater core 26.

Heating the cabin 22 utilizing thermal energy generated when charging the battery 14 lessen burdens on the chiller 30 while reducing time required to bring the cabin 22 to an appropriate temperature.

Figure 4:
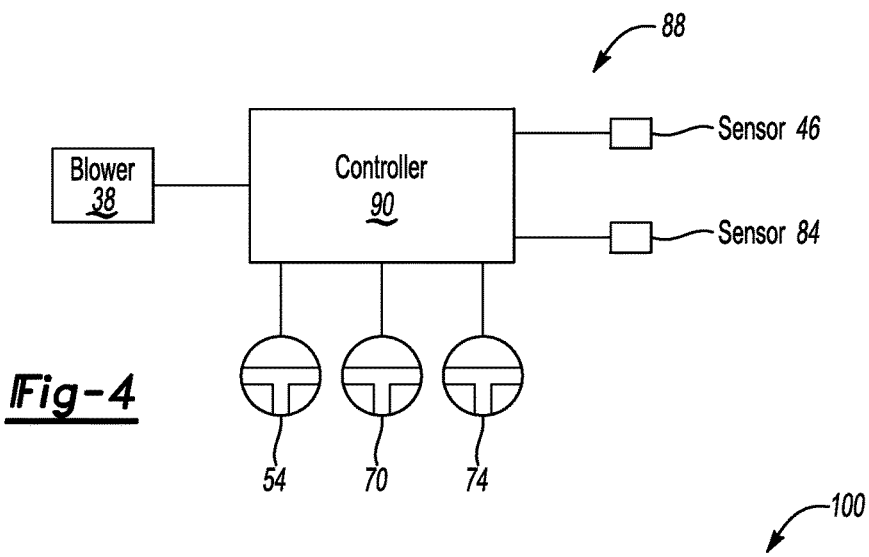
FIG. 4 shows a battery and cabin control system operating condition.

Referring to FIG. 4, a controller arrangement 88 used in connection with the system 10 of FIG. 1 to FIG. 3 includes a controller 90 operatively coupled to at least the blower 38, the sensor 46, and the sensor 84. The controller 90 is also operatively coupled to the valve 54, 70, and 74. The controller 90 can also operatively couple to other valves, sensors, fans, cabin blower and battery radiator fan, heater and an air conditioning compressor.

The controller 90 can include connections that enable the controller 90 to recognize when the battery 14 is charging and whether the charging is being accomplished utilizing a DC fast charge, or another type of charge.

In some examples, the controller 90 additionally links to sensors associated with the cabin 22, ambient, etc. The controller 90 can receive additional data from these sensors, such as outside air temperatures, cabin temperatures, etc. The additional data can provide further information for guiding the controller 90 to select between the first operating condition, the second operating condition, or the third operating condition.

The controller 90 can include a processor operatively linked to a memory portion. The example processor can be programmed to execute a program stored in the memory portion. The program can be stored in the memory portion as software code.

The program stored in the memory portion can include one or more additional or separate programs, each of which includes an order listing of executable instructions for implementing logical functions. The instructions enable the controller 90 to, among other things, initiate movement of the valves 52, 70, and 74 to change the system 10 to operate under the first operating condition, the second operating condition, or the third operating condition. The instructions enable the controller 90 to regulate cooling to the battery and to further regulate heating provided to the heater core 26 when charging the battery.

Figure 5:
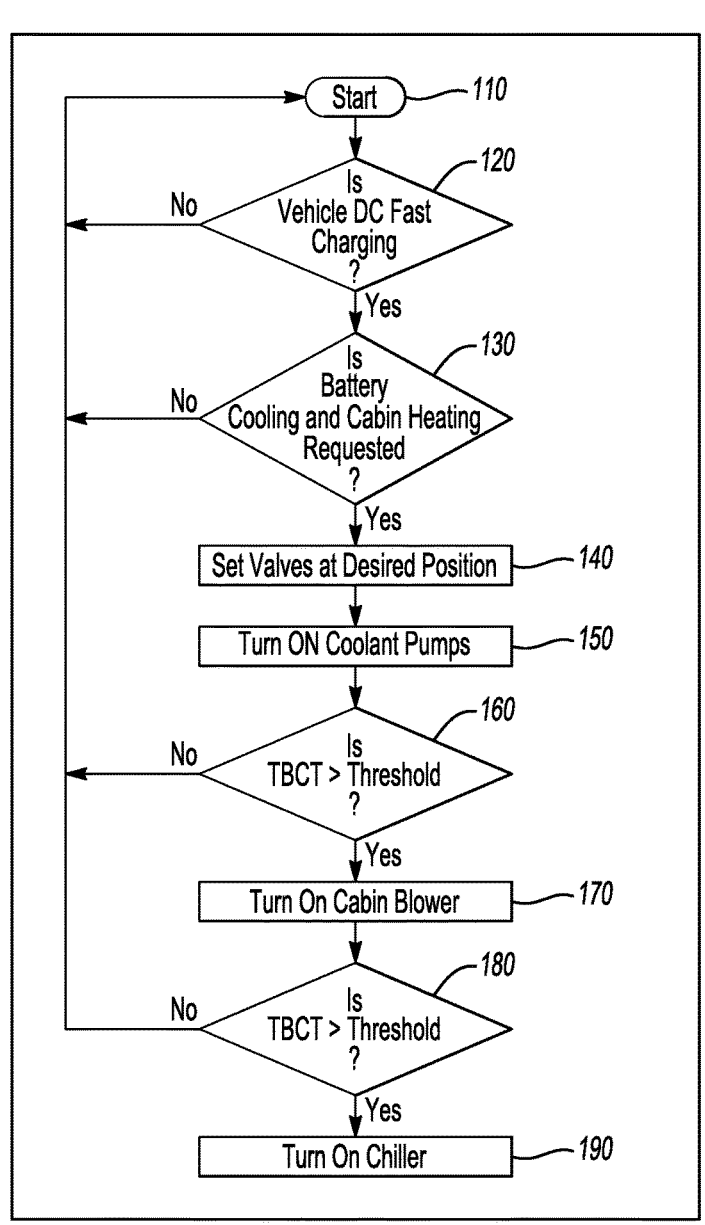
FIG. 5 shows a highly schematic view of a controller arrangement used in connection with the battery and cabin control systems of FIGS. 1, 2, and 3.

Referring to FIG. 5, the flow of an example method 100 utilized by the controller 90 starts at a step 110 and moves to a step 120, which assesses whether the vehicle is fast charging. If not, the method 100 returns to the step 110.

If the method 100 at the step 120 determines that the electrified vehicle is fast charging, the method 100 moves to a step 130, which assesses whether the battery 14 requires cooling and whether the cabin 22 requires heating. If not, the method 100 returns to the step 110.

If yes, the method 100 moves from the step 130 to a step 140, which positions the valves 52, 70, and 74 so that the system 10 is operating under the third operating condition. The method 100 next turns on coolant pumps at a step 150. Both the pump 32 and the pump 42 can be turned on. In another example, only the pump 32 or the pump 42 is activated at the step 140.

The method 100 then moves to a step 160, which assesses whether the temperature of fluid detected by the sensor 46, sensor 84, or both is above a temperature threshold value. If not, the method 100 returns to the step 110, which means the coolant is still flowing using circuit 80 to warm up the coolant further. In such a situation, the cabin 22 is not heated and the chiller is not operating. In this example, the temperature threshold value represents a minimum temperature for the fluid that will effectively heat the cabin 22.

If the temperature detected by the sensor 46 or sensor 84 is above the temperature threshold value, the method 100 moves to a step 170 where the controller 90 activates the blower 38 to move air through the heater core 26 and remove thermal energy from the fluid within the heater core 26.

The method 100 then moves to the step 180, which assesses whether the temperature of the fluid detected at the sensor 46 is above the threshold temperature value with the blower 38 moving air through the heater core 26. If not, the method returns to the start 110. The thermal energy generated from charging is thus effectively being dissipated by heating the cabin 22 so the chiller 30 doesn't need to run. If the thermal energy in the coolant wasn't dissipated at the cabin 22, the chiller 30 would start. If yes, the heater core 26 has not removed sufficient thermal energy from the fluid to effectively cool the battery 14. Accordingly, the method 100 moves to the step 190, which turns on the chiller 30 to remove additional thermal energy from the fluid until the fluid moving to the battery 14 is at a temperature appropriate for cooling the battery 14.

Features of this disclosure include a system that reduces energy use required to thermally manage an electrified vehicle. Burdens on the chiller during charging are reduced, and energy that would be required to power the heater is reduced. Charge times can be reduced and, if capacity of the chiller is not limited, less energy is used to cool the battery.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electrified vehicle assembly, comprising:
 a battery pack;
 a cabin heater; and
 a coolant loop that communicates liquid coolant from the battery pack to the cabin heater, the cabin heater configured to heat a cabin of a vehicle with thermal energy from liquid coolant, the thermal energy generated when charging the battery pack from an external power source, the external power source external to the vehicle, wherein the liquid coolant cools the battery pack when charging the battery pack from the external power source.

2. The assembly of claim 1, wherein the cabin heater comprises a heater core configured to transfer thermal energy from the liquid coolant in the coolant loop directly to a flow of air that heats the cabin of the vehicle.

3. The assembly of claim 2, further comprising a blower that moves the flow of air through the cabin heater.

4. The assembly of claim 1, further comprising a chiller, the coolant loop to further communicate the liquid coolant from the cabin heater to the chiller.

5. The assembly of claim 4, further comprising a refrigerant loop, wherein the chiller is configured to transfer thermal energy from the liquid coolant in the coolant loop to an expandable refrigerant in the refrigerant loop.

6. The assembly of claim 1, further comprising a valve assembly configured to direct the liquid coolant from the battery pack to the cabin heater under some operating conditions, and configured to direct the liquid coolant from the battery pack to a radiator under other operating conditions.

7. The assembly of claim 1, further comprising a valve assembly configured to direct the liquid coolant from the battery pack to the cabin heater under some operating conditions, and configured to direct the liquid coolant from the battery pack to a chiller under other operating conditions.

8. The assembly of claim 1, wherein the charging is a fast charge.

9. A method of cooling a battery pack during charging, comprising:
 communicating a liquid coolant through a battery pack to remove thermal energy from the battery pack that is generated when charging the battery pack from an external power source that is external to a vehicle having the battery pack, wherein the liquid coolant cools the battery pack when charging the battery pack from the external power source; and
 communicating the liquid coolant from the battery pack to a cabin heater.

10. The method of claim 9, further comprising transferring thermal energy from the liquid coolant to a flow of air at a heater core of the cabin heater, and heating a cabin of the vehicle using the flow of air.

11. The method of claim 10, further comprising maintaining the liquid coolant in a liquid phase during the transferring and heating.

12. The method of claim 9, wherein the charging is a fast charge.

13. The method of claim 12, wherein the charging is a DC fast charge.

14. The method of claim 9, further comprising communicating the liquid coolant away from the battery pack using a coolant loop that extends from within the battery pack to the cabin heater, and transferring thermal energy from the liquid coolant that has moved from within the battery pack directly to a flow of air at the cabin heater.

15. The method of claim 14, further comprising communicating the liquid coolant along the coolant loop from the cabin heater to a chiller and transferring thermal energy from the liquid coolant to an expandable refrigerant at the chiller.

16. The method of claim 15, further comprising, after the charging, actuating at least one valve to cause the coolant loop to extend from the battery pack to a radiator, and communicating the liquid coolant through the radiator to remove thermal energy from the liquid coolant.

17. The method of claim 16, further comprising, after the charging, actuating at least one valve to cause the coolant loop to extend from the battery pack to a chiller, and communicating the liquid coolant through the chiller to remove thermal energy from the liquid coolant.

18. The electrified vehicle of claim 1, further comprising the external power source electrically coupled to the battery pack.

19. An electrified vehicle assembly, comprising:
 a battery pack that is selectively electrically coupled to an external power source that is external to a vehicle;
 a cabin heater; and
 a coolant loop that communicates liquid coolant from the battery pack to the cabin heater when the battery pack is electrically coupled to the external power source, the cabin heater configured to heat a cabin of the vehicle using thermal energy from liquid coolant, the thermal energy generated when charging the battery pack from the external power source, wherein the battery pack is cooled by the liquid coolant when the battery pack is charging from the external power source.

* * * * *